Aug. 7, 1945.  L. B. BOYD  2,381,102
FLEXIBLE ADAPTER
Filed Oct. 12, 1943
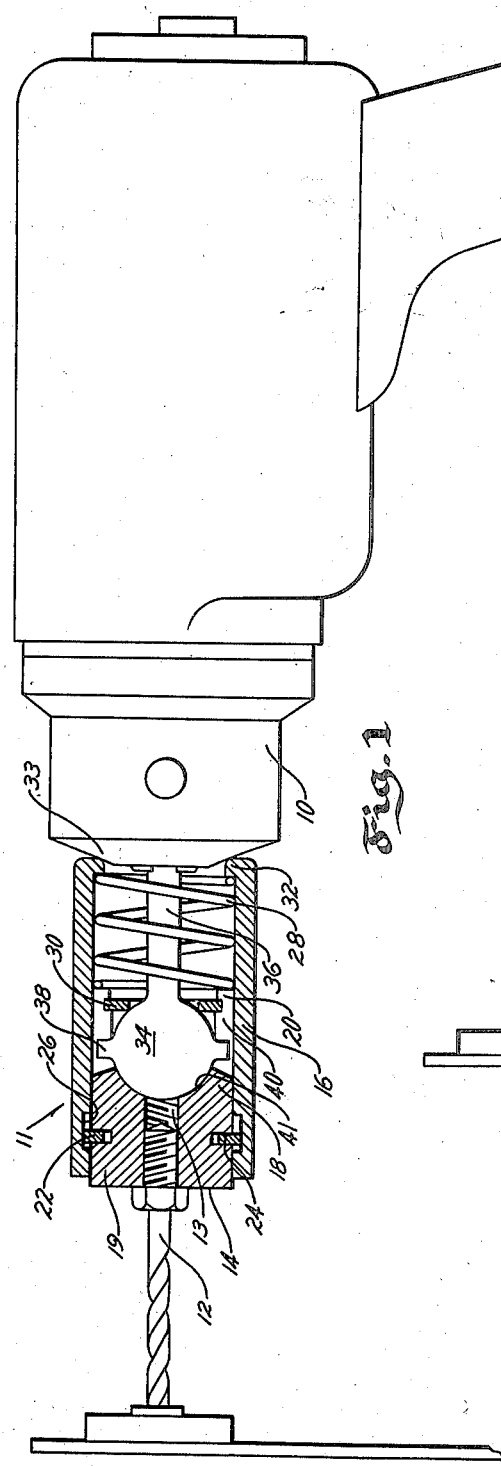
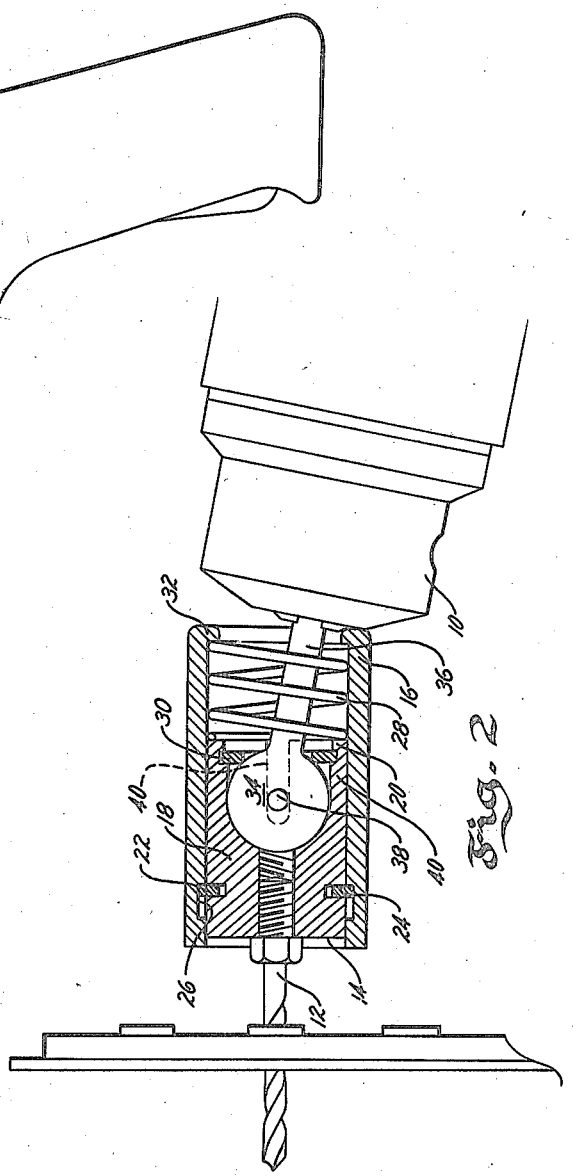
Leo B. Boyd
INVENTOR.
BY Edwin Coates
ATTORNEY Patented Aug. 7, 1945

2,381,102

UNITED STATES PATENT OFFICE 2,381,102

FLEXIBLE ADAPTER

Leo B. Boyd, Gardena, Calif., assignor to Douglas Aircraft Company, Inc., Santa Monica, Calif.

Application October 12, 1943, Serial No. 506,013

5 Claims. (Cl. 64—7)

This invention relates to an adapter designed to be used with power driven hand tools and particularly with electric drills.

The hard steel of which drills are made is relatively brittle and little lateral pressure is required to break them. The cost of new drill bits and the time lost by the operator in removing the broken drill, drawing a new drill bit from the tool crib and inserting the new drill bit, represents a serious additional expense apart from the danger of marring the hole or work piece as can easily happen when drilling the thinner gauges of metal without the use of a jig.

Much of the hand drilling in mass production is done with drilling jigs which comprise a relatively heavy plate having holes drilled therethrough in the patterns in which the work is to be drilled, the jig being positioned against the work. The holes in the jig are usually furnished with steel bushings to prevent wear of the holes in the jig. Thus the length of the hole usually is several times the diameter of the hole in the smaller drill sizes. A very slight angularity of pressure on the drill will therefore bind the bit in the hole and break the drill.

It is quite common for an inexperienced mechanic to fail to apply pressure to the drill perfectly perpendicularly to the work, and while the jig may nevertheless hold the drill bit sufficiently true while cutting, when the resistance of the metal is suddenly removed the operator can easily skew the drill in the jig and work and break the drill.

The general object of the invention is to provide an adapter or separate fitting which may be readily applied to an electric drill or similar power tool when work is to be done which may result in breakage due to the circumstances above discussed.

An object of the invention is to provide a flexible adapter for power driven hand tools such as electric drills, which can be mounted in the chuck of the tool as easily as the bit, the bit itself being mounted in the work face of the adapter.

A further object of the invention is to provide a flexible adapter which is simple and inexpensive to construct and without readily separable parts when assembled.

A still further object of the invention is to provide a flexible adapter in which the pressure exerted by the operator is transmitted solidly to the tool while the latter is cutting through the work but if a lateral force between the tool and the tool motor is set up, as when the tool pierces the work, the lateral force on the bit is taken up by the adapter, thus avoiding jamming of the tool in the jig and/or work and breakage of the tool.

Yet another object of the invention is to provide a flexible adapter which may be readily fitted for use with different types of drills or other tools.

Still further features of the invention may appear from the following specification and/or accompanying illustrative drawing. It is to be understood that the scope of the invention is not in any way limited by the described embodiment of the invention but only as defined by the scope of the appended claims.

In the drawing, in which identical numerals indicate identical parts,

Figure 1 is a side view partly in section showing a drill fitted with the adapter in operation.

Figure 2 is a plan view similar to Figure 1 but showing the drill motor exerting a skewing pressure on the drill after the drill has pierced the work.

In Figure 1 the numeral 10 indicates the chuck of a drill motor in which the flexible adapter 11 is mounted. A snake drill bit 12 is threaded into a tapped bore 13 in the work face 14 of the adapter.

The body of the adapter comprises an outer shell 16, and an inner member 18 formed with a work head 19 at one end of the adapter, and a tubular rearwardly extending portion 20. The member 18 has an easy sliding fit in shell 16 and is limited in its longitudinal movement therein by a ring 22 fitted closely into a circumferential groove 24 in the work head 19 and projecting into a wide circumferential groove 26 formed in the inner periphery of the forward end of the shell. The inner member 18 is normally held in outward position by a spring 28, preferably so that the work head 19 projects from the outer end of the shell. The spring 28 is held under compression between the inner end of the tubular portion 20 of the inner member 18 and the inwardly turned inner end 32 of the outer shell 16. The member 18 is reduced in thickness at the inner end to receive a washer 30 and rolled over the edge thereof. The inwardly turned end 32 also provides a rolling contact with the head 33 of the chuck 10 of the drill motor when a lateral thrust is applied to the drill bit, causing tilting of the outer shell and inner member as later explained.

The adapter is driven by a ball shaped member 34 having a projecting stem 36 which is gripped by the chuck 10 of the power drill. The ball shaped member is provided with projections 38 working against the side walls of longitudinally extending slots 40 formed in the tubular rearwardly extending portion 20 of the inner member 18. The head of the ball member 34 bears forwardly against a socket 41 formed in the rear surface of the work head 19 and bears at its rearward side against washer 30. Ball 34 is thus held against longitudinal movement in the inner member 18 but is free to rock relatively to the longitudinal axis of said member.

It is pointed out that a snake drill bit has been shown mounted in the work head as a matter of illustration only. By screwing in an adapter plug threaded at one end to fit the threaded bore in the work head, and threaded to fit a chuck at the other end or furnished with a taper to fit a chuck having a tapered bore, a variety of tools may be used with the adapter.

It will be noted that the adapter provides a good bearing surface for the transmission of pressure from the drill motor handle through the drill chuck 16 and ball headed member 34 to the ball socket 40 of the work head 19 and to the drill stem threaded therein. Spring 28 exerts a considerable centering effort on the assembly and the construction therefore gives the operator the feeling of a solid drive combined with a feeling of axial disalinement when the axis of the drill motor is not in line with that of the drill bit.

When the resistance of the material being drilled is suddenly removed the jar is liable to cause an inexperienced operator to momentarily move the motor laterally to a slight extent, resulting in the jamming of the drill in the drill jig and drill hole. In a tool provided with the adapter of this invention the angular movement of the motor is permitted by the rocking of the ball shaped member, as shown in Figure 2, this movement being permitted by the sliding of the outer shell 16 over the inner member 18 within the limit of travel movement permitted by locking ring 22 in the wide slot 26, and against the pressure exerted by the spring 28. The described movement of the parts minimizes transference of lateral thrust to the drill stem and therefore avoids jamming of the drill bit.

Various modifications may be made in the flexible adapter of this invention by those skilled in the art without departing from the scope of the invention as defined by the scope of the appended claims.

I claim:

1. A flexible coupling for a power driven hand tool including an annular shoulder symmetrically disposed relative to the operative axis of the tool comprising: a driving member held in the motor unit and driven by the tool motor; a driven member provided with means for holding an operating tool; universal joint elements between said driving and driven members; means holding said driving and driven members against separation; a tubular member surrounding said driven member and in guiding and limited sliding engagement therewith; an inwardly projecting abutment carried by said tubular member; and resilient means held under compression and positioned between the driven member and the abutment on said tubular member and acting to hold one end of said tubular member against said annular shoulder said resilient means serving to maintain the driving and driven member in axial alignment to transmit thrust exerted by the operator from the motor unit to the tool operated thereby during normal operation during which the annular shoulder is in symmetrical engagement with the end of the tubular member, but permitting tilting of the motor unit and annular shoulder, to occur relatively to the axial line of the operative tool, by displacement of the tubular member, due to the consequent tilted relation of the annular shoulder to the end of the tubular member by sliding over the driving member against the resistance of the resilient means, thus minimizing lateral thrust on the operative tool.

2. A flexible coupling for a power driven hand tool including an annular shoulder symmetrically disposed relative to the operative axis of the tool comprising: a driving member held in the motor unit and driven by the tool motor; a driven member comprising a cylindrical part provided at one end with means to hold an operative tool and with thrust transmitting universal joint elements at the opposite end; thrust transmitting universal joint elements on the end of said driving member cooperating with the universal joint elements on said driven member; means holding said driving and driven members against separation; a tubular member surrounding said driven member and in guiding and limited sliding engagement therewith and carrying an inwardly projecting abutment; and resilient means held under compression and positioned between the driven member and the abutment on said tubular member and acting to hold one end of said tubular member against said annular shoulder, said resilient means serving to maintain the driving and driven member in axial alignment to transmit thrust exerted by the operator from the motor unit to the tool operated thereby during normal operation during which the annular shoulder is in symmetrical engagement with the end of the tubular member, but permitting tilting of the motor unit and annular shoulder, to occur relatively to the axial line of the operative tool, by displacement of the tubular member, due to the consequent tilted relation of the annular shoulder to the end of the tubular member by sliding over the driving member against the resistance of the resilient means, thus minimizing lateral thrust on the operative tool.

3. A flexible coupling for a power driven hand tool including an annular shoulder symmetrically disposed relative to the operative axis of the tool comprising: a driving member having a stem mounted in the chuck of said tool and having a spherical surface at its head end; pins projecting laterally and radially from said driving member; a cylindrical driven member provided with a seat to receive the spherical head of the driving member and with slots to receive the pins projecting from said driving member; retaining means acting to prevent separation of said spherical surface of the driving member from the seat in the driven member while permitting rocking movement in all directions of said driven member relatively to said driving member; a tubular member surrounding said driven member and in guiding and limited sliding engagement therewith and carrying an inwardly projecting abutment; and resilient means held under compression and positioned between the driven member and the abutment on said tubular member and acting to hold one end of said tubular member against said annular shoulder, said resilient means serving to maintain the driving and driven member in axial alignment to transmit thrust exerted by the operator from the motor unit to the tool operated thereby during normal operation during which the annular shoulder is in symmetrical engagement with the end of the tubular member but permitting tilting of the motor unit and annular shoulder to occur relatively to the axial line of the operative tool, by displacement of the tubular member, due to the consequent tilted relation of the annular shoulder to the end of the tubular member by sliding over the driving member against the resistance of the resilient means, thus minimizing lateral thrust on the operative tool.

4. A flexible coupling for a power driven hand tool including an annular shoulder symmetrically disposed relative to the operative axis of the tool comprising: a driving member having a stem mounted in the chuck of said tool and having a spherical surface at its head end; pins projecting laterally and radially from said driving member; a cylindrical driven member provided with a seat to receive the spherical head of the driving member and with slots to receive the pins projecting from said driving member; retaining means acting to prevent separation of said spherical surface of the driving member from the seat in the driven member while permitting rocking movement in all directions of said driven member relatively to said driving member; a tubular member surrounding said driven and driving member and in sliding engagement with said driven member; a lock ring mounted in the periphery of said driven member and received in a peripheral groove in the inner surface of said tubular member, said groove being sufficiently wide to permit a desired degree of relative movement of the driving and driven member; a peripheral inwardly projecting abutment at the end of said tubular member toward said motor unit; and resilient means held under compression and positioned between the driven member and the abutment on said tubular member and acting to hold one end of said tubular member against said annular shoulder, said resilient means serving to maintain the driving and driven member in axial alignment to transmit thrust exerted by the operator from the motor unit to the tool operated thereby during normal operation during which the annular shoulder is in symmetrical engagement with the end of the tubular member, but permitting tilting to an extent limited by the stem of the driving member of the motor unit and annular shoulder, to occur relatively to the axial line of the operative tool, by displacement of the tubular member, due to the consequent tilted relation of the annular shoulder to the end of the tubular member by sliding over the driving member against the resistance of the resilient means, thus minimizing lateral thrust on the operative tool.

5. A flexible driving connection between the motor unit and the tool of a power driven hand tool comprising: a driving member held in said motor unit and driven by said tool motor; a driven member coaxial with said driving member and arranged to hold a tool; a universal joint connection between said driving and driven members; means for maintaining said universal joint elements in engagement; a tubular member in which said driving and driven members are nested and having a guiding and limited sliding engagement with said driven member; and resilient means under compression arranged between said driven member and tubular member and acting to hold the end of said tubular member against an annular surface associated with said motor unit and symmetrically disposed relative to the operative axis of the tool.

LEO B. BOYD.